United States Patent [19]

Quackenbush

[11] Patent Number: 5,072,542
[45] Date of Patent: Dec. 17, 1991

[54] GRAVESTONE SADDLE PLANTER

[76] Inventor: Doyle Quackenbush, R.R. 11, Bedford, Ind. 47421

[21] Appl. No.: 459,121

[22] Filed: Dec. 29, 1989

[51] Int. Cl.⁵ .............................................. A01G 17/06
[52] U.S. Cl. .................................. 47/41.01; 47/41.12; 248/229; 248/313; 220/23.4
[58] Field of Search .................... 47/68, 86, 39, 41.01, 47/40, 41.12; 248/229, 231.8, 316.7, 313; 220/23.4

[56] References Cited

U.S. PATENT DOCUMENTS

| | | | |
|---|---|---|---|
| 1,293,785 | 2/1919 | Hurst | 47/68 |
| 1,544,016 | 6/1925 | Lyman | 248/231.8 |
| 2,076,941 | 4/1937 | Farr | 248/316.7 |
| 2,815,606 | 12/1957 | Quackenbush | 47/41.12 |
| 3,511,461 | 3/1962 | Clark . | |
| 3,809,799 | 5/1974 | Taylor | 248/316.7 |
| 3,857,482 | 12/1974 | Shelton | 220/23.4 |
| 4,118,892 | 10/1978 | Nakamura | 220/23.4 |
| 4,559,738 | 12/1985 | Helfman | 47/68 |
| 4,640,045 | 2/1987 | Nesbitt | 47/39 |

FOREIGN PATENT DOCUMENTS

| | | | |
|---|---|---|---|
| 2144443 | 2/1973 | Fed. Rep. of Germany | 47/68 |
| 614016 | 12/1960 | Italy | 248/313 |

Primary Examiner—Henry E. Raduazo
Attorney, Agent, or Firm—Woodard, Emhardt, Naughton, Moriarty & McNett

[57] ABSTRACT

A saddle planter adapted to be mounted on a gravestone is disclosed. The saddle planter includes a container including clips to attach the container to a second container for expanding the size of the floral display. The saddle planter also includes mounting brackets that are slidably attached to the container from the underside of the container. The brackets include resilient legs or gripping members at the ends of the legs. The legs are adapted to supply horizontal forces to the front and rear of the gravestone. The brackets include cushioned pads or gripping members which contact the front and rear surfaces of the gravestone, thereby supplying vertical frictional gripping forces. The pads prevent scarring and marking of the gravestone due to the force applied by the bracket to the surface of the gravestone, as well as creating a high friction contact with the gravestone surfaces.

16 Claims, 7 Drawing Sheets

5,072,542

GRAVESTONE SADDLE PLANTER

The present invention relates generally to devices for displaying memorial decorations and flowers on a cemetery gravestone, and more particularly to an apparatus which attaches to the gravestone.

BACKGROUND OF THE INVENTION

It is customary to place decorations adjacent to a gravestone or other grave marker. Typically, a container having flowers or other decorations therein is mounted or attached to such a stone, or placed near the stone on the ground. Cemetery groundskeepers find memorials placed on the ground near a grave to be obstacles difficult to maneuver around with mowers and the like. As a result of the difficulty in maneuvering around such memorials, cemeteries have promulgated rules requiring that decorations such as flowers, plants, plastic flowers and the like, must be removed prior to the days that the mowing and trimming is to be done. Persons placing such decorations near a grave want the decoration to be displayed as long as possible, if not permanently, and thus are greatly inconvenienced by the necessity to remove the decoration from the gravesite prior to the mowing and trimming process.

A variety of devices have been invented over the years to eliminate the requirement that the gravestone memorial be removed. Examples of such devices are shown in the following patents: U.S. Pat. No. 4,640,045 to Newsbitt et al., and U.S. Pat. No. 3,511,461 to Clark. A primary shortcoming of the devices developed in the prior art for displaying flowers on a gravestone is the lack of flexibility in adapting the device to mount on a variety of gravestones. Additionally, the devices of the prior art incorporate certain metallic components, and rainwater dripping over the metallic components produces rust and subsequently rusty water drips upon the gravestone, thereby discoloring the surface of the gravestone. In addition, the variety of shapes and contours of gravestones, in particular the front to back width and the contour of the top surface of the gravestone, present something of a dilemma to the saddle planters of the prior art in achieving the most beneficial positioning of the mounting structures for the devices. It is desired to provide the public with a saddle planter which requires no tools for installation. A device which is more easily configured or adaptable to various sizes of gravestones and simple to install on a gravestone is needed.

SUMMARY OF THE INVENTION

A gravestone saddle planter according to the present invention includes a device for mounting a container on a gravestone comprising a first substantially U-shaped resilient bracket adapted to removably and slidably engage the container, and a second substantially U-shaped resilient bracket attached to the first bracket and having gripping members on the legs of the second bracket, the second bracket being adapted to removably grip the gravestone.

It is an object of this inventin to provide an improved saddle planter for supporting flowers or other memorial decorations on a gravestone.

It is a further object of this invention to provide a holder which is readily attached and removed from the top surface of a gravestone.

It is yet another object of this invention to provide a gravestone saddle planter having mounting legs slidably adjustable with respect to the flower container.

It is yet another object of this invention to provide a gravestone saddle planter made entirely of plastic or other suitable synthetic materials in order to prevent damage to the gravestone in the form of abrasive contact or discoloration as seen with the oxidation and corrosion of saddle planters of the prior art.

These and other objects of the present invention will become apparent from the following description of the preferred embodiment.

DESCRIPTION OF THE PREFERRED EMBODIMENT

Figure 1:
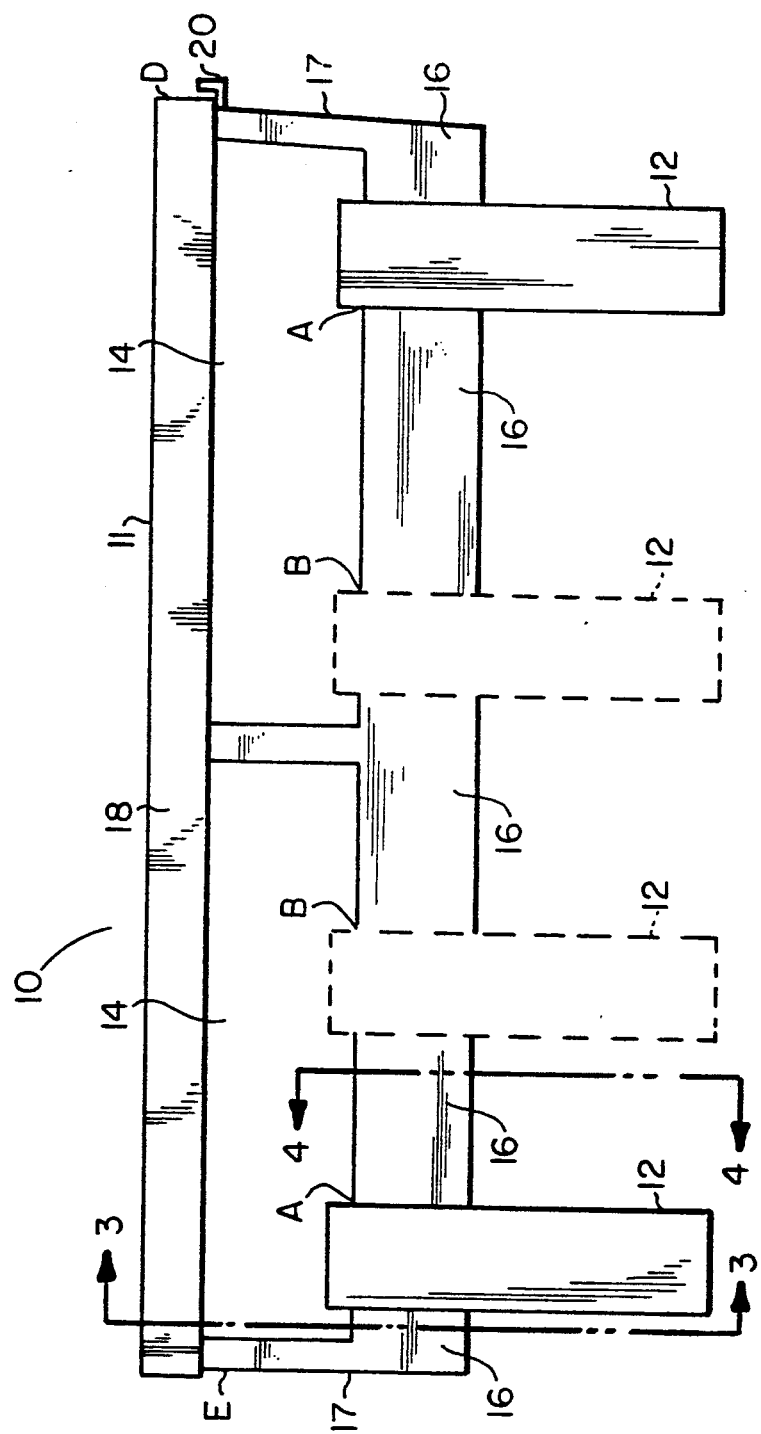
FIG. 1 is a front elevational view of the saddle planter according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a front elevational view of the saddle planter 10 according to the present invention is shown. The saddle planter 10 is comprised of container 11 and brackets 12. Container 11 includes side walls 16, end walls 17, openings 14, and a top rail 18. The container 11 may be molded as a one-piece unit from any appropriate synthetic material, including plastics such as polyethylene, polystyrene, polypropylene, etc.

Clips 20 located near location D of container 11 are designed to mate and interlock with openings 15 (shown in FIG. 2) in end walls 17 near location E of a similar second container (not shown). The interlocking design for removably connecting location D of container 11 with a similar container also having clips 20 and openings 15 provides a means by which the saddle planter can be multiplied in size to accommodate a larger floral display. Additional detail regarding clips 20 is shown in FIG. 2.

Figure 2:
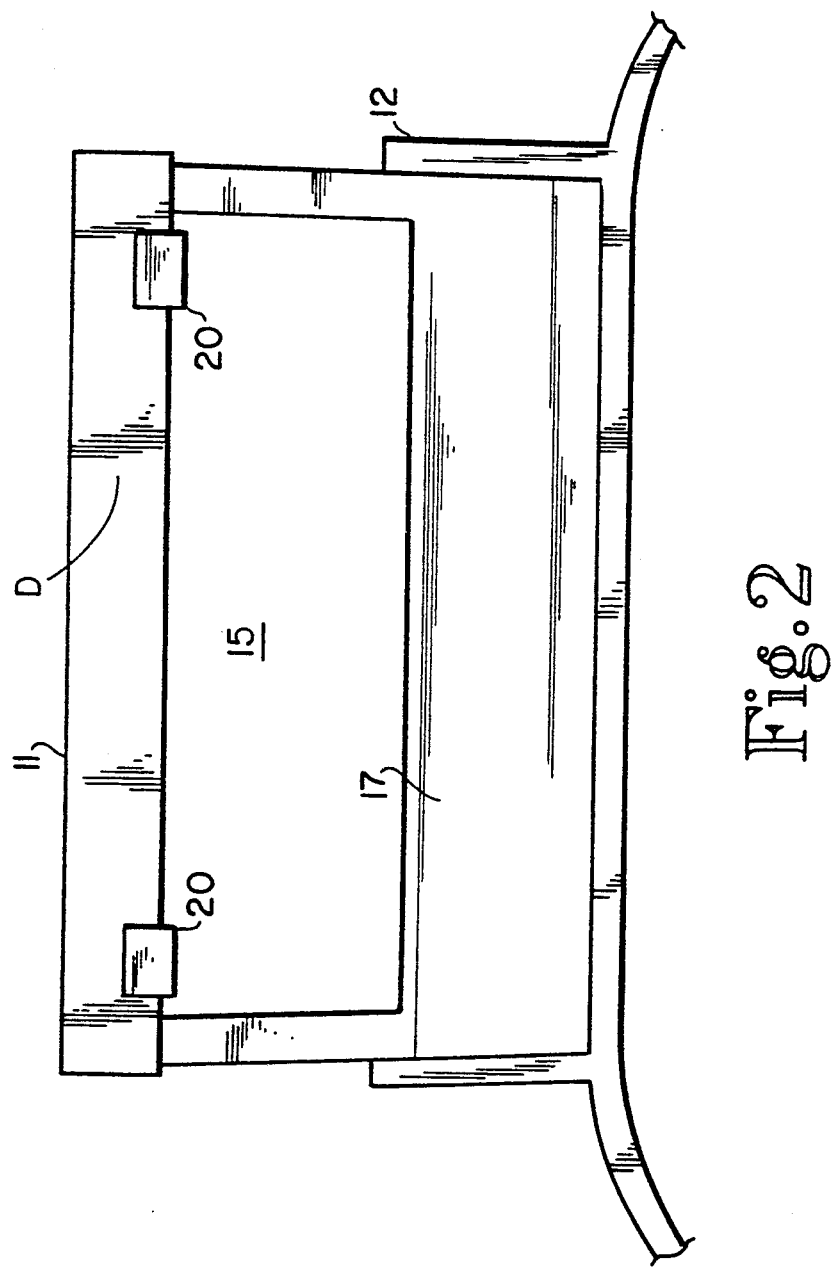
FIG. 2 is a side elevational view view of the saddle planter according to the present invention.

FIG. 2 is a side view of the saddle planter according to the present invention of end D of FIG. 1. Clips 20, shown in FIG. 2, are square plastic clips which interlock with rail 18 at location E as shown in FIG. 1. Opening 15 in end wall 17 is shown to illustrate the general design of the container 11. An opening 15 is provided at both end walls 17, and clips 20 engage such an opening when two containers 11 are interconnected to form a larger flower container. Both end walls 17 are identical with the exception of the addition of the clips 20 to end wall 17 near location D of FIGS. 1 and 2. Bracket 12 is also shown attached to the underside of container 11 in FIG. 2.

Referring now to FIG. 1, brackets 12 are shown removably and slidably attached to container 11 at locations A. If desired, once attached to container 11, the brackets 12 can slide from locations A to locations B wherein broken lines depict alternate locations for brackets 12. Movement of the brackets 12 from location A to location B is desired when the top surface of the gravestone upon which the saddle planter is mounted varies in dimensions or contour from a horizontal planar surface, thus requiring relocation of brackets 12 to a more convenient mounting position. It should be noted that each bracket 12 may be located anywhere within the openings 14 defined by side walls 16. Thus, the brackets 12 need not be located in a symmetric fashion, but may be located in whatever convenient location is most desired for mounting the saddle planter 10 on a gravestone. In the case of larger floral displays wherein several containers 11 are connected via clips 20, additional brackets 12 may be employed where needed along the side walls 16.

Figure 3:
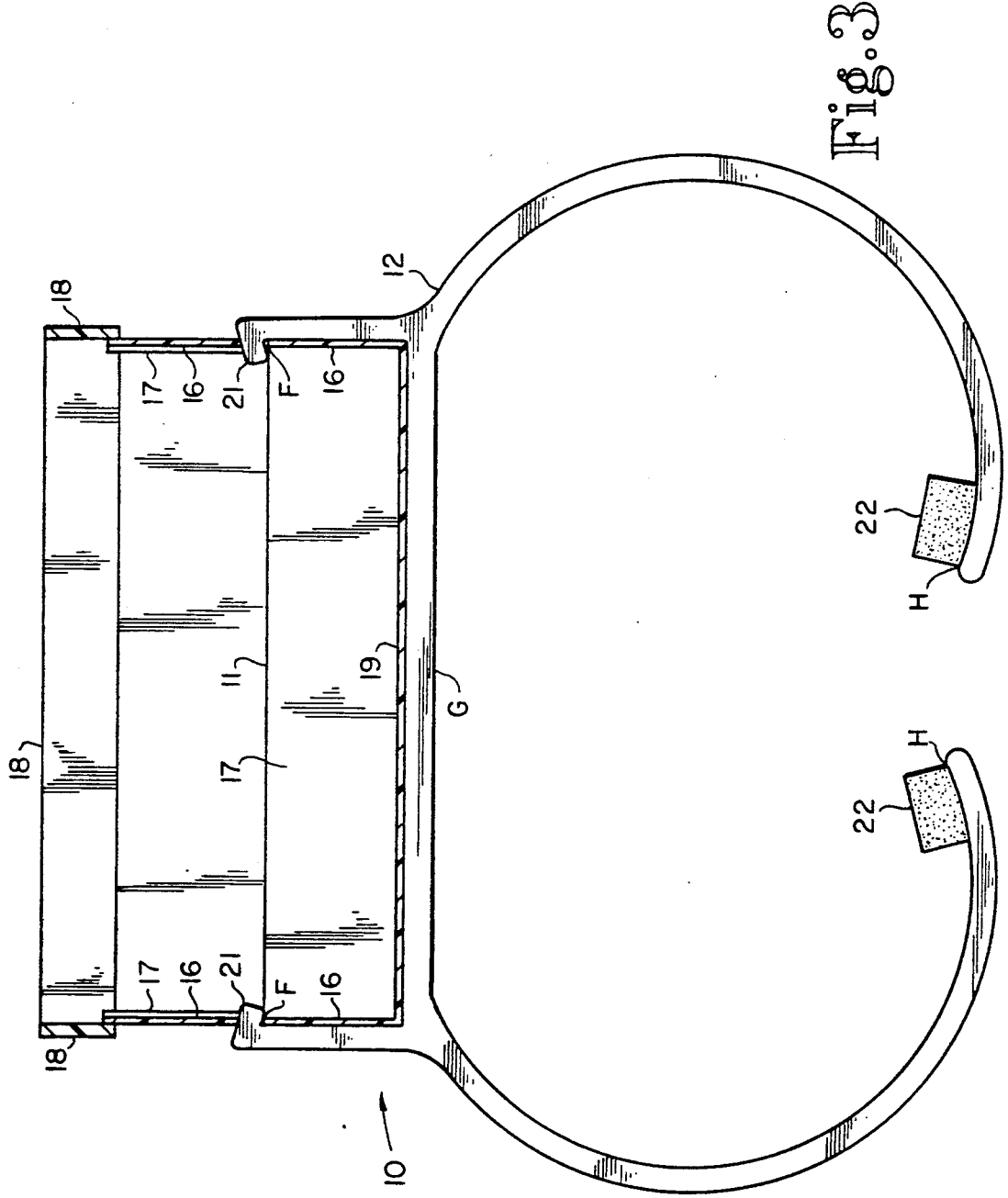
FIG. 3 is a sectional view in the direction of the arrows labelled 3 in FIG. 1.

Referring now to FIG. 3, a sectional view of the saddle planter 10 according to the present invention along the arrows labelled 3 of FIG. 1 is shown. Bracket 12 is a single piece bracket which snaps onto the container 11 from the underside. Bracket 12 resembles two U-shaped portions attached back to back extending upwards and downwards when the saddle planter 10 is viewed from a side elevational perspective as mounted on a gravestone. Bracket 12 attaches flush against bottom wall 19 and side walls 16 and grips side walls 16 by way of tabs 21 inclined downward from horizontal in order to provide a retaining force at locations F. Rails 18 are shown attached to side walls 16 and end walls 17.

Pads 22, made of a resilient sponge or foam material, are fixedly attached with glue or the like to resilient bracket 12 as shown so that bracket 12 can rest upon the top of a gravestone with surface G contacting the top of the gravestone and pads 22 contacting the front and rear surfaces of the gravestone to protect the gravestone from marring, marking or scratching. Pads 22 are also designed to provide a frictional gripping action with respect to the front and rear surface of a gravestone, thereby securing the saddle planter on top of the gravestone, even under adverse conditions such as high wind and heavy rains. To mount the saddle planter 10 on a gravestone, bracket 12 is spread apart by hand at locations H so that pads 22 are separated by a distance greater than the width (front to rear) or span (side to side) of the gravestone. Subsequently, the legs of bracket 12 are released at point H, and inward forces developed by the resilient action of bracket 12 are supplied to opposing surfaces of the gravestone, thereby gripping the gravestone and holding the saddle planter in place on top of the gravestone. Bracket 12 is preferably made of polycarbon and the container 11 is made of styrene and manufactured using injection molding techniques for styrene plastics. Polymers and other synthetic materials or plastics recognized as substitutes for styrene and polycarbon are also contemplated as base materials for the bracket 12 and container 11.

As can be seen by the ease with which the bracket 12 is spread apart and the saddle planter 10 mounted on a gravestone, the mounting technique, coupled with the ability to slide brackets 12 longitudinally with respect to the container 11, provides a more convenient and versatile saddle planter when compared with those shown in the prior art. The saddle planter according to the present invention may be adapted to a variety of gravestones having various contours across the top surface and various thicknesses from front to rear or side to side.

Figure 4:
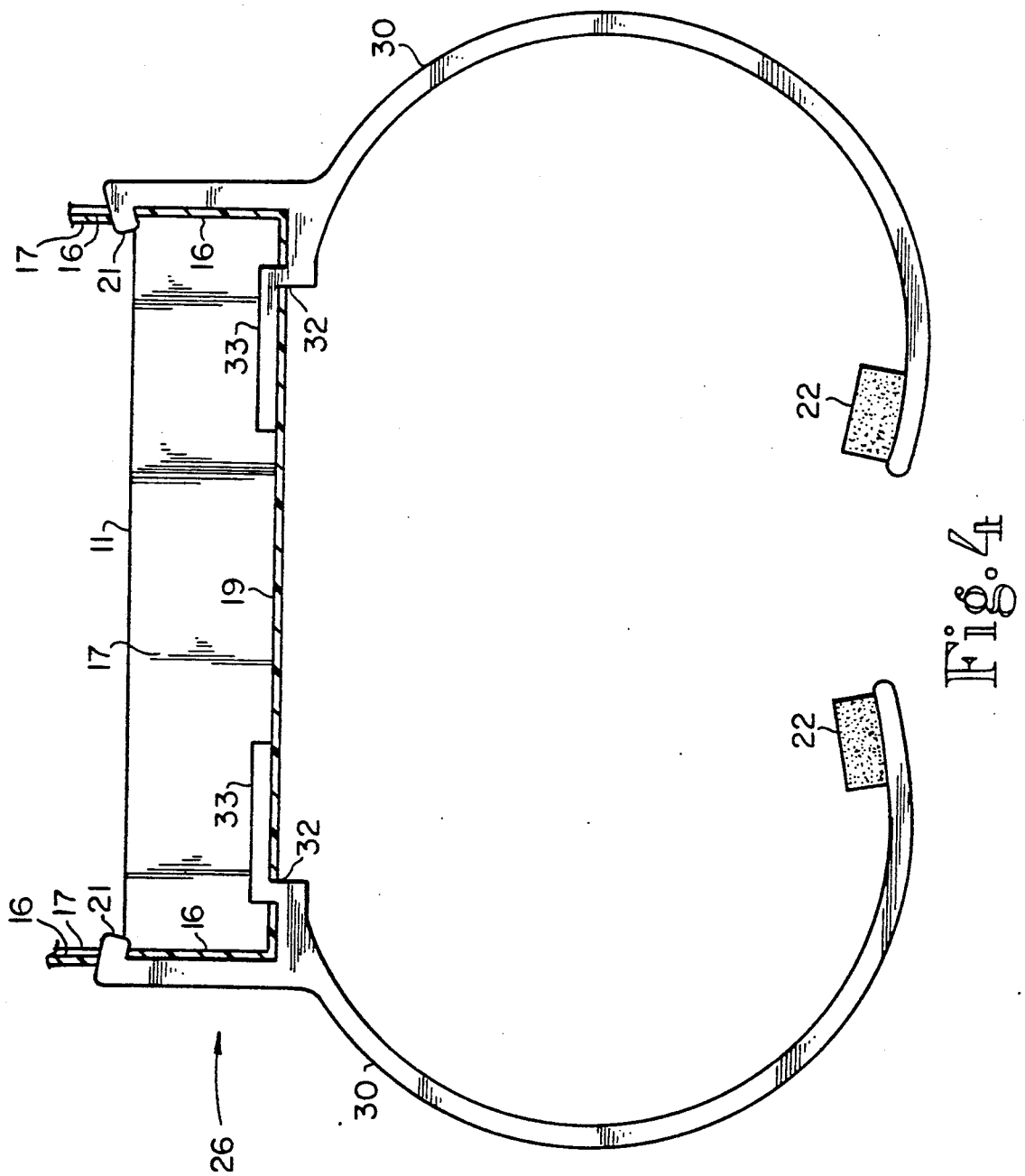
FIG. 4 is a sectional view of the saddle planter of FIG. 1 in the direction of the arrows labelled 4 showing an alternate embodiment of the mounting brackets.

Referring now to FIG. 4, a partial sectional view in the direction of the arrows labelled 4 of FIG. 1, of an alternate embodiment of the saddle planter according to the present invention is shown. The alternate embodiment of FIG. 4 includes brackets 30 which, in comparison to the bracket 12 of FIG. 3, are mounted to container 11 through slots 32 in the bottom wall 19 of container 11. Slots 32 extend along the bottom of the container from near each end wall 17 to approximately the middle of each side wall 16, thereby providing continuously variable locations for mounting brackets 30. Pads 22 are attached to bracket 30 by way of gluing or other well known adhesive techniques for attaching a resilient compressible pad to a polycarbon plastic member such as bracket 30. Tabs 21 are shown gripping side walls 16 through openings in side wall 16 as in FIG. 3. Bracket tabs 33 are shown resting against bottom wall 19. Bottom wall 19 provides a firm support for forces developed as brackets 30 are spread apart near pads 22 to receive the top of a gravestone therebetween.

Figure 5:
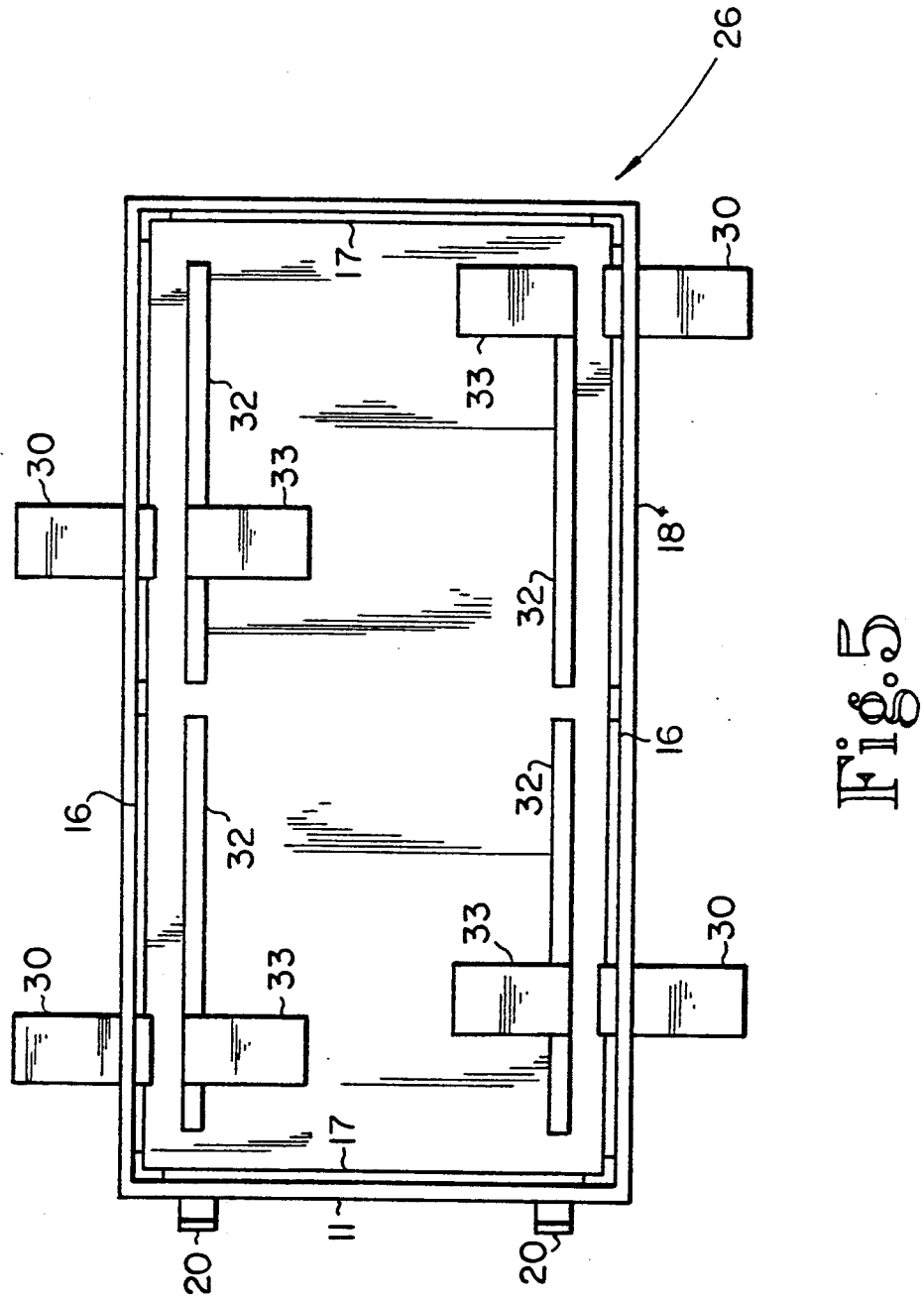
FIG. 5 is a top plan view of a saddle planter according to the present invention.

Referring now to FIG. 5, a plan view of the saddle planter 26 of FIG. 4 is shown. Bracket tabs 33 are shown emerging from slots 32 in bottom wall 19 at various locations relative to the end walls 17 of the container 11. Thus, if it is desired to locate brackets 30 closer to end walls 17, the brackets 30 can be slid or moved along slot 32 and openings in side walls 16 to provide the most convenient location for brackets 30 to grip or contact the gravestone. Also shown attached to the alternate embodiment of the saddle planter 26 are tabs 20, which perform an identical function as the tabs of FIG. 1. Top rail 18, side walls 16, and end walls 17 are shown in this view of the saddle planter 26. Additionally, the plan view of bottom wall 19 shows slots 32 formed therein.

Figure 6:
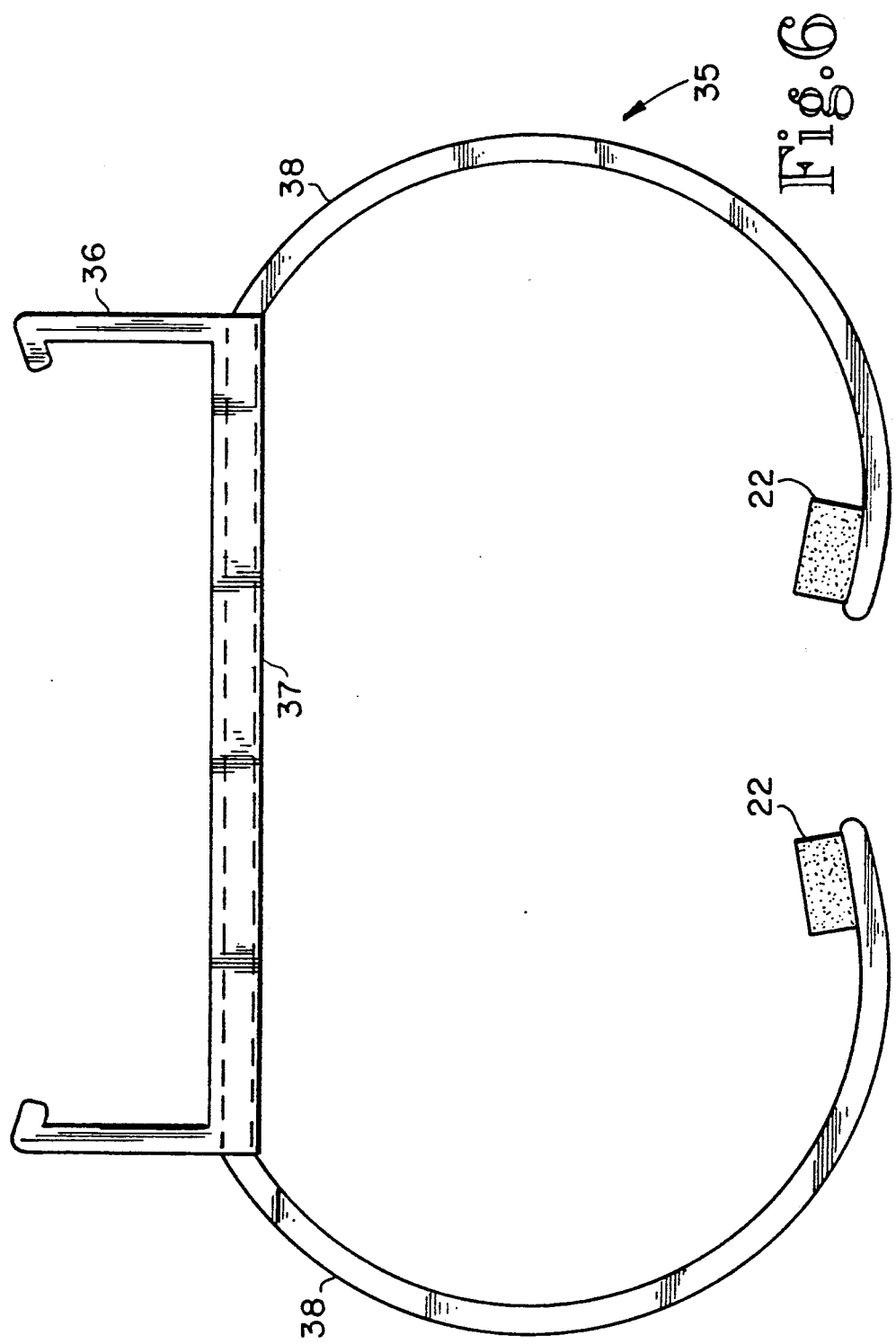
FIG. 6 is a side elevational view of an alternate embodiment of a mounting bracket for the present invention.
Figure 7:
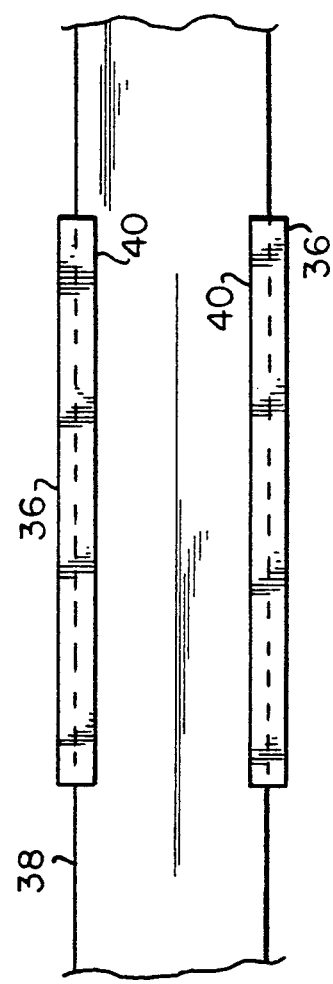
FIG. 7 is a partial bottom view of the mounting bracket of FIG. 6.

Referring now to FIGS. 6 and 7, an alternate embodiment for the bracket 12 of FIG. 3 is shown. Bracket 35 includes resilient legs or clamps 38 and mating bracket 36. Mating bracket 36 is formed to include a channel along the underside 37 of bracket 36. Legs 38 are a single piece clamp retained within the underside 37 of bracket 36 by a retaining lip 40 as shown in FIG. 7. Mating bracket 36 is molded out of styrene, or other plastic, and clamp 38 is made of polycarbon plastic which exhibits highly resilient characteristics. As with the bracket shown in FIG. 3, the bracket of FIG. 6 also includes pads 22 performing an identical function as previously described for the pads 22 of FIG. 3.

Structural reinforcements or thicker plastic moldings are contemplated for areas of the container 11 subject to higher stress forces encountered in the embodiment of FIG. 5. Slots 32 are not required for the embodiments shown in FIGS. 1, 2, 3, 6 and 7, but may be included if not detrimental to structural strength of the container 11.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A gravestone saddle planter device comprising:
   a container;
   a first substantially U-shaped resilient bracket removably attached to said container from beneath the container, said first bracket being slidable with respect to the container while attached to the container; and
   a second substantially U-shaped resilient bracket attached to said first bracket and having a base and two legs extending therefrom with gripping members attached to the distal end of each of said legs, said legs of said second bracket being biased towards one another at the distal ends and resiliently separable to receive the top surface of a gravestone having a width ranging from less than the width of said base of said U-shaped bracket to a width substantially greater than the width of said base of said U-shaped bracket, and wherein said gripping members removably grip opposing surfaces of the gravestone.

2. The device of claim 1 wherein said container includes first and second end walls, side walls and clip means located on said first end wall, said container further including clip receiving means located on said second end wall, said clip means formed to removably attach said container to a clip receiving means of a second container.

3. The device of claim 1 wherein said second U-shaped bracket is made of plastic.

4. The device of claim 3 wherein said gripping members are compressible resilient pads attached to said second bracket at the distal end thereof to protect the surfaces of said gravestone from damage attributable to physical contact between said second bracket and said gravestone.

5. The device of claim 1 wherein said first U-shaped bracket is made of plastic.

6. A gravestone saddle planter device comprising:
   a container including first and second end walls, side walls and clip means located on said first end wall, said container further including clip receiving means located on said second end wall, said clip means formed to removably attach said container to a clip receiving means of a second container and wherein said side walls include horizontal slots;
   a first substantially U-shaped resilient bracket adapted to removably and slidably engage said container, wherein said first bracket includes means for slidably engaging said horizontal slots; and
   a second substantially U-shaped resilient bracket attached to said first bracket and having gripping members on the legs of said second bracket, said second bracket being adapted to removably grip opposing surfaces of the gravestone.

7. A floral support stand for a gravestone comprising:
   a container having an open top, a bottom and side walls, said container being adapted to receive a medium for the embedding therewithin of the stems of flowers, said container further having tab receiving means on said side walls for receiving mounting tabs; and
   a support stand removably attached to said container adjacent said bottom wall, said stand including a member spanning the bottom of said container, a vertical member extending upward adjacent said walls of said container, said vertical member having mounting tab means for resiliently engaging said tab receiving means, said support stand further including first and second resilient gripping means extending substantially downward from said horizontal member, wherein said first gripping means is biased to exert an inward force on a front surface of said gravestone and wherein said second gripping means is biased to exert an inward force on a rear surface of said gravestone, and wherein said first and second gripping means are resiliently separable to removably grip opposing surfaces of a variety of gravestones having varying thicknesses.

8. The floral support stand of claim 7 wherein said support stand is made of plastic.

9. The floral support stand of claim 7 wherein said side walls of said container include container connection means for connecting said container to a second container having said container connection means.

10. The floral support stand of claim 7 wherein said container and said support stands are made entirely of plastic.

11. A device for mounting a memorial display container on a gravestone comprising:
    first and second half-brackets attached to the container at locations on opposite sides of the container wherein each of said half-brackets includes:
    a) container engaging means for removably and slidably engaging said container; and
    b) a resilient retaining member attached to and extending generally downward from said container engaging means along a path parallel with a retaining means of an opposing half-bracket engaging the opposite side of the container and wherein said first and second retaining members are resiliently separable and biased toward one another to receive the top surface of a gravestone having a width substantially greater than the normal distance separating said retaining members when attached to the container, wherein said retaining members removably grip opposing surfaces of the gravestone.

12. The device of claim 11 wherein said container includes side walls, end walls, and a bottom wall, said bottom wall including two slots extending parallel with said side walls for receiving said container engaging means.

13. The device of claim 12 wherein said retaining means is made of plastic.

14. The device of claim 11 including resilient pads attached to said retaining members at a location furthest from said container engaging means and between said resilient retaining member and the gravestone.

15. A bracket for mounting a container on a gravestone comprising:
    a first substantially U-shaped resilient bracket adapted to removably attach to said first bracket and slidable with respect to said container while attached to said container; and
    a second substantially U-shaped resilient bracket attached to said first bracket and having a base, two legs extending outward from said base, and gripping members on the legs of said second bracket, said first bracket oriented to support a container from beneath the container and said second bracket oriented to straddle the upper surface of the gravestone, said legs of said second bracket being resiliently separable to receive the top surface of a gravestone having a width ranging from less than the width of said base of said U-shaped bracket to a width substantially greater than the width of said base of said U-shaped bracket, and wherein said gripping members removably grip opposing surfaces of the gravestone.

16. The bracket of claim 15 wherein said second U-shaped bracket is constructed of a highly resilient plastic material.

* * * * *